United States Patent
Sharma et al.

(10) Patent No.: US 10,277,717 B2
(45) Date of Patent: Apr. 30, 2019

(54) NETWORK INTROSPECTION IN AN OPERATING SYSTEM

(71) Applicant: Nicira, Inc., Palo Alto, CA (US)

(72) Inventors: Gaurav Sharma, Pune (IN); Prasad Dabak, Pune (IN)

(73) Assignee: NICIRA, INC., Palo Alto, CA (US)

( * ) Notice: Subject to any disclaimer, the term of this patent is extended or adjusted under 35 U.S.C. 154(b) by 615 days.

(21) Appl. No.: 14/106,777

(22) Filed: Dec. 15, 2013

(65) Prior Publication Data

US 2015/0172153 A1 Jun. 18, 2015

(51) Int. Cl.
*G06F 9/54* (2006.01)
*H04L 29/06* (2006.01)

(52) U.S. Cl.
CPC ............ *H04L 69/162* (2013.01); *G06F 9/545* (2013.01)

(58) Field of Classification Search
USPC ........................................................ 709/224
See application file for complete search history.

(56) References Cited

U.S. PATENT DOCUMENTS

| | | | |
|---|---|---|---|
| 6,675,218 B1 * | 1/2004 | Mahler | ................... H04L 29/06 370/229 |
| 7,801,128 B2 | 9/2010 | Hoole et al. | |
| 8,127,291 B2 | 2/2012 | Pike et al. | |
| 8,352,941 B1 | 1/2013 | Protopopov et al. | |
| 8,365,294 B2 | 1/2013 | Ross | |
| 2005/0050377 A1 | 3/2005 | Chan et al. | |
| 2005/0071840 A1 | 3/2005 | Neiger et al. | |
| 2007/0078915 A1 * | 4/2007 | Gassoway | ............. G06F 21/562 |
| 2007/0192862 A1 | 8/2007 | Vermeulen et al. | |
| 2007/0226788 A1 * | 9/2007 | Lee | ..................... H04L 63/0236 726/11 |
| 2007/0250929 A1 | 10/2007 | Herington et al. | |
| 2007/0266433 A1 | 11/2007 | Moore | |
| 2008/0127292 A1 * | 5/2008 | Cooper | .................. G06F 21/53 726/1 |
| 2008/0189769 A1 | 8/2008 | Casado et al. | |
| 2008/0196100 A1 | 8/2008 | Madhavan et al. | |
| 2008/0222717 A1 | 9/2008 | Rothstein et al. | |
| 2008/0244569 A1 | 10/2008 | Challener et al. | |
| 2008/0289028 A1 | 11/2008 | Jansen et al. | |

(Continued)

FOREIGN PATENT DOCUMENTS

GB 2479619 10/2011

OTHER PUBLICATIONS

Garfinkel, Tal, et al., "A Virtual Machine Introspection Based Architecture for Intrusion Detection," In Proc. Network and Distributed Systems Security Symposium, Feb. 2003, 16 pages.

*Primary Examiner* — Hermon Asres
(74) *Attorney, Agent, or Firm* — Su IP Consulting

(57) ABSTRACT

According to examples of the present disclosure, a method is provided to perform network introspection in an operating system that comprises a user memory space and a kernel memory space. The method may comprise, in response to an initiation of a socket operation, filtering the socket operation at a socket layer in the kernel memory space using a socket operation filter hook associated with the socket operation. The method may further comprise performing an introspection action associated with the socket operation filtered using the socket operation filter hook.

15 Claims, 8 Drawing Sheets

(56) References Cited

U.S. PATENT DOCUMENTS

| | | | |
|---|---|---|---|
| 2009/0006603 A1 | 1/2009 | Duponchel et al. | |
| 2009/0006847 A1* | 1/2009 | Abzarian | H04L 63/0227 713/164 |
| 2009/0113031 A1 | 4/2009 | Ruan et al. | |
| 2009/0122710 A1 | 5/2009 | Bar-Tor et al. | |
| 2009/0144410 A1* | 6/2009 | Fink | H04L 43/062 709/224 |
| 2009/0249473 A1 | 10/2009 | Cohn | |
| 2009/0328194 A1* | 12/2009 | Kim | H04L 63/0272 726/15 |
| 2010/0138830 A1 | 6/2010 | Astete et al. | |
| 2010/0235831 A1 | 9/2010 | Dittmer | |
| 2011/0072486 A1 | 3/2011 | Hadar et al. | |
| 2011/0078497 A1 | 3/2011 | Lyne et al. | |
| 2011/0107331 A1 | 5/2011 | Evans et al. | |
| 2011/0107406 A1 | 5/2011 | Frost et al. | |
| 2011/0119748 A1 | 5/2011 | Edwards et al. | |
| 2011/0258701 A1 | 10/2011 | Cruz et al. | |
| 2012/0054781 A1† | 3/2012 | Tzruya | |
| 2013/0074181 A1 | 3/2013 | Singh | |
| 2013/0322266 A1* | 12/2013 | Maon | H04L 41/14 370/252 |
| 2013/0347131 A1 | 12/2013 | Mooring et al. | |
| 2014/0194094 A1† | 7/2014 | Ahuja | |

\* cited by examiner

† cited by third party

NETWORK INTROSPECTION IN AN OPERATING SYSTEM

BACKGROUND

Unless otherwise indicated herein, the approaches described in this section are not prior art to the claims in this application and are not admitted to be prior art by inclusion in this section.

It is often useful for computer systems to determine, in real time, characteristics of software components and processes running on the computer system. The ability to determine such characteristics and gather information about them is generally called introspection. Network introspection, which is one type of system introspection, may be used for detection, protection, main management, compliance and security enforcement, etc.

DETAILED DESCRIPTION

Figure 1:
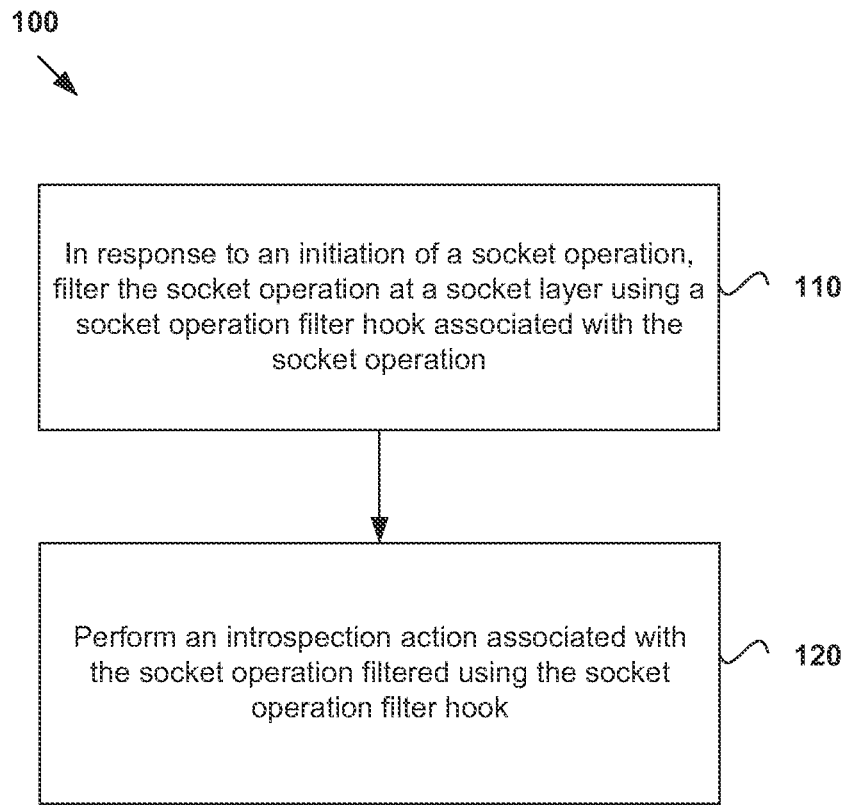
FIG. 1 is a flowchart of an example process to perform network introspection in an operating system, in accordance with at least some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a flowchart of an example process to perform network introspection in an operating system, in accordance with at least some embodiments of the present disclosure. Process 100 may include one or more operations, functions, or actions illustrated by one or more blocks, such as blocks 110 and 120. The various blocks may be combined into fewer blocks, divided into additional blocks, and/or eliminated based upon the desired implementation. Process 100 may be performed in an operating system comprising a user memory space and a kernel memory space.

At block 110, in response to an initiation of a socket operation, the socket operation is filtered at a socket layer of the kernel memory space using a socket operation filter hook associated with the socket operation.

At block 120, an introspection action associated with the socket operation filtered using the socket operation filter hook is performed.

According to examples of the present disclosure, socket operation filter hooks provide greater versatility for filtering socket operations at the socket layer in the kernel memory space. In the present disclosure, the term "socket layer" may refer generally to an Application Programming Interface (API) supported by the kernel memory space. The term "socket operation filter hook" may refer generally to a piece of code that alters the behaviour of a socket operation allowing either additional or alternative processing to occur. The term "filtering" may refer generally to the interception of the socket operation by the socket operation filter hook, for example, to gather information about the socket operation.

According to examples of the present disclosure, network introspection may be performed at the socket layer in the kernel memory space, instead of at a packet level in the protocol layer. Compared to processing packets at the transport or network layer in the TCP/IP reference model, processing socket operations at the kernel socket layer is less resource intensive. In contrast, packet processing is generally more computationally expensive because packet headers need to be parsed before the actual payload may be examined. Network introspection at the socket layer may also provide better capability to gather information of network events initiated in the user memory space or kernel memory space, such as pre-operation and post-operation events, etc.

Operating System

Figure 2:
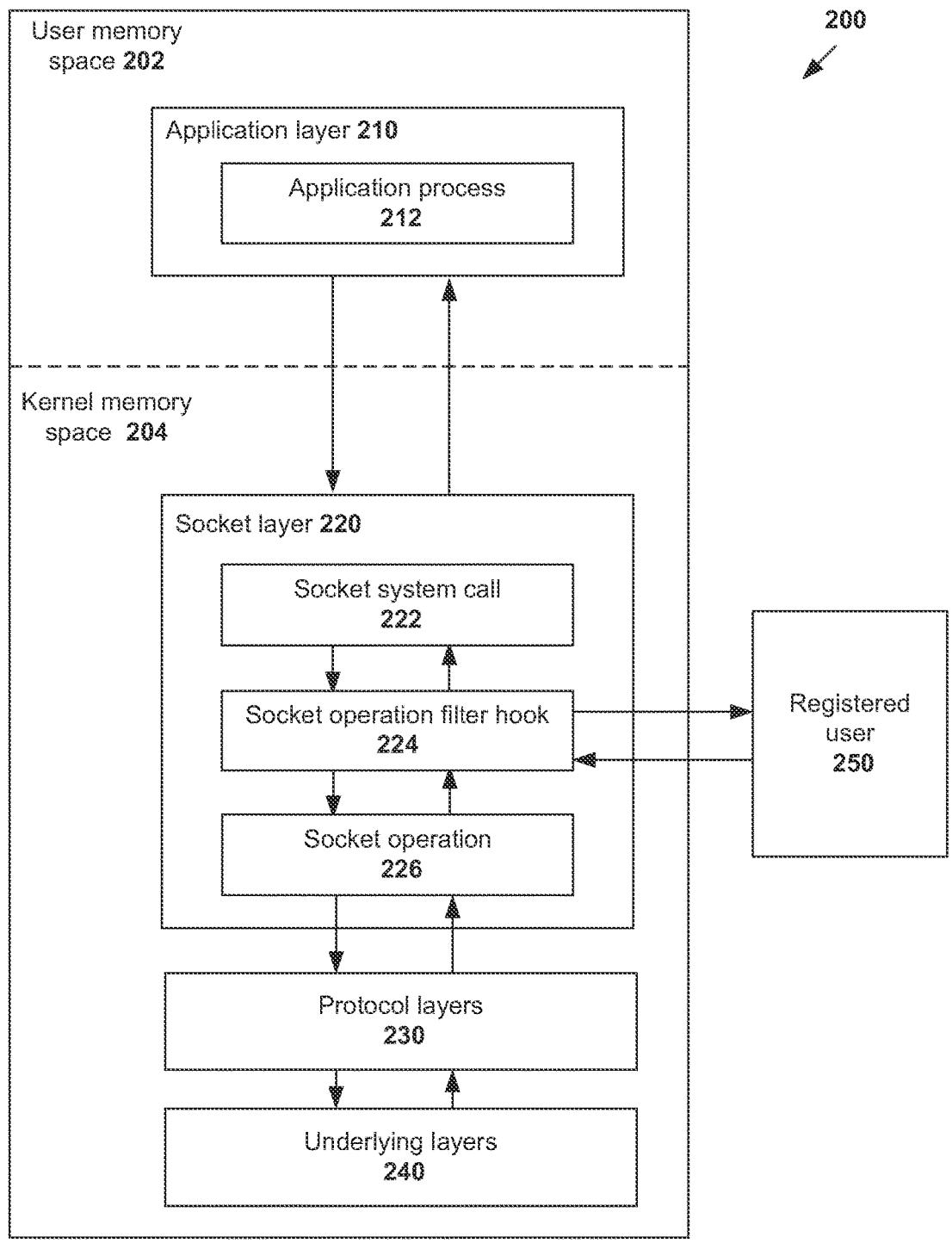
FIG. 2 is a schematic diagram of an example operating system in which network introspection may be performed, in accordance with at least some embodiments of the present disclosure.

FIG. 2 is a schematic diagram of an example operating system in which network introspection may be performed, in accordance with at least some embodiments of the present disclosure. Operating system 200 may include user memory space 202, kernel memory space 204, and other components not shown in FIG. 2. Any suitable operating system may be used, such as Linux, etc.

User memory space 202 is the memory space where user application processes 212 (one shown for simplicity) are executed in application layer 210. To facilitate inter-process communication, a socket is created to represent a communication endpoint for application process 212. The communicating application processes 212 may be running on the same operating system or different ones, and on the same machine or different ones.

Kernel memory space 204 is the memory space where kernel processes run. Socket layer 220 serves as a protocol-independent interface between application layer 210 and protocol-dependent layers 230 residing below socket layer 220. For example, protocol-dependent layers 230 may include transport layer (e.g. Transmission Control Protocol, TCP) and network layer (e.g. Internet Protocol, IP). Further underlying interface layers 240 may include MAC (Media Access Control) layer and physical layer (e.g. physical network interface cards).

Socket layer 220 represents an Application Programming Interface (API) supported by kernel memory space 204 to allow application processes 212 to control and use sockets. For example, in a Linux kernel, socket layer 220 may be implemented as a set of system calls, and user memory space 202 accesses the kernel memory space 204 via the system calls.

Although not shown in FIG. 2 for simplicity, a function library in user memory space 202 may be coupled with a system call interface in kernel memory space 204 to handle system calls. The function library (e.g., GNU C Library GLIBC, etc.) provides wrapper functions that are often named as the same as the system calls and pass function arguments from user memory space 202 to kernel memory space 204. The system call interface then acts as a dispatcher or multiplexer to invoke the relevant system call in kernel memory space 204.

In a conventional logic flow (i.e. without socket operation filter hooks 224), socket operation 226 is initiated and executed after a corresponding system call is invoked. For example, application process 212 in user memory space 202 may invoke socket system call 222, e.g. connect( ) via a function library call. In response, socket layer 220 executes socket operation 226 that is specific to the protocol family of the socket, e.g. connect_op( ). The result of socket operation 226, and in turn system call 222, is then returned to application process 212.

Socket Operation Filter Hooks

According to examples of the present disclosure, socket layer 220 is modified to include socket operation filter hooks 224 to enable network introspection at the socket layer 220. The modification may be performed on the fly before the initiation of socket operation 226 at block 110 in FIG. 1.

Socket operation filter hooks 224 allow filtering of socket operations 226 at socket layer 220. Here, filtering using a socket operation filter hook refers generally to the interception of socket operation 226 by interposing the socket operation filter hook 224 between socket system call 222 and socket operation 226 at socket layer 220. In other words, socket operation filter hook 224 acts like a "filter" or "trap" to detect and gather information of socket operations 226. Any information gathered during the filtering process may be reported to registered user 250. Throughout the present disclosure, the term "registered user" may be an application, process or module etc. in user memory space 202 or kernel memory space 204. The "registered user" may also reside on the same machine or different ones.

Figure 3:
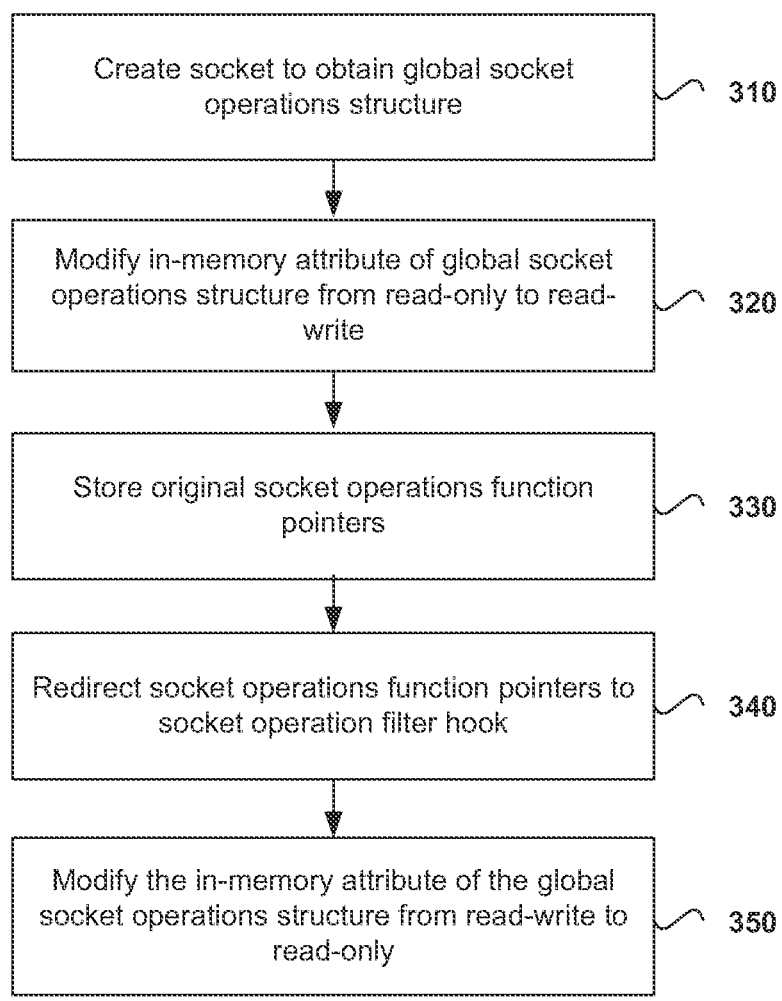
FIG. 3 is a flowchart of an example process to modify a global socket operations structure in a socket layer to include socket operation filter hooks, in accordance with at least some embodiments of the present disclosure.

FIG. 3 is a flowchart of an example process to modify a global socket operations structure in socket layer 220 to include socket operation filter hooks, in accordance with at least some embodiments of the present disclosure. Process 300 may include one or more operations, functions, or actions illustrated by one or more blocks, such as blocks 310 to 350. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation. The modification may be performed by operating system 200 programmatically, such as using a piece of machine-readable instructions in kernel memory space 204 etc. In this case, operating system 200 performs blocks 310 to 350 during the modification.

At block 310 in FIG. 3, a socket is created to obtain a global socket operations structure. For example, in a Linux kernel, the global socket operations structure 405 may be 'const struct proto_ops' in a socket structure 400 'struct socket'. Table 1 shows an example of the 'struct socket' structure.

TABLE 1

| Socket structure |  |
| --- | --- |
| struct socket { | |
| socket_state | state; |
| short | type; |
| unsigned long | flags; |
| const struct proto_ops | *ops; |
| struct file | *file; |
| struct sock | *sk; |
| struct socket_wq | *wq; |
| } | |

Figure 4:
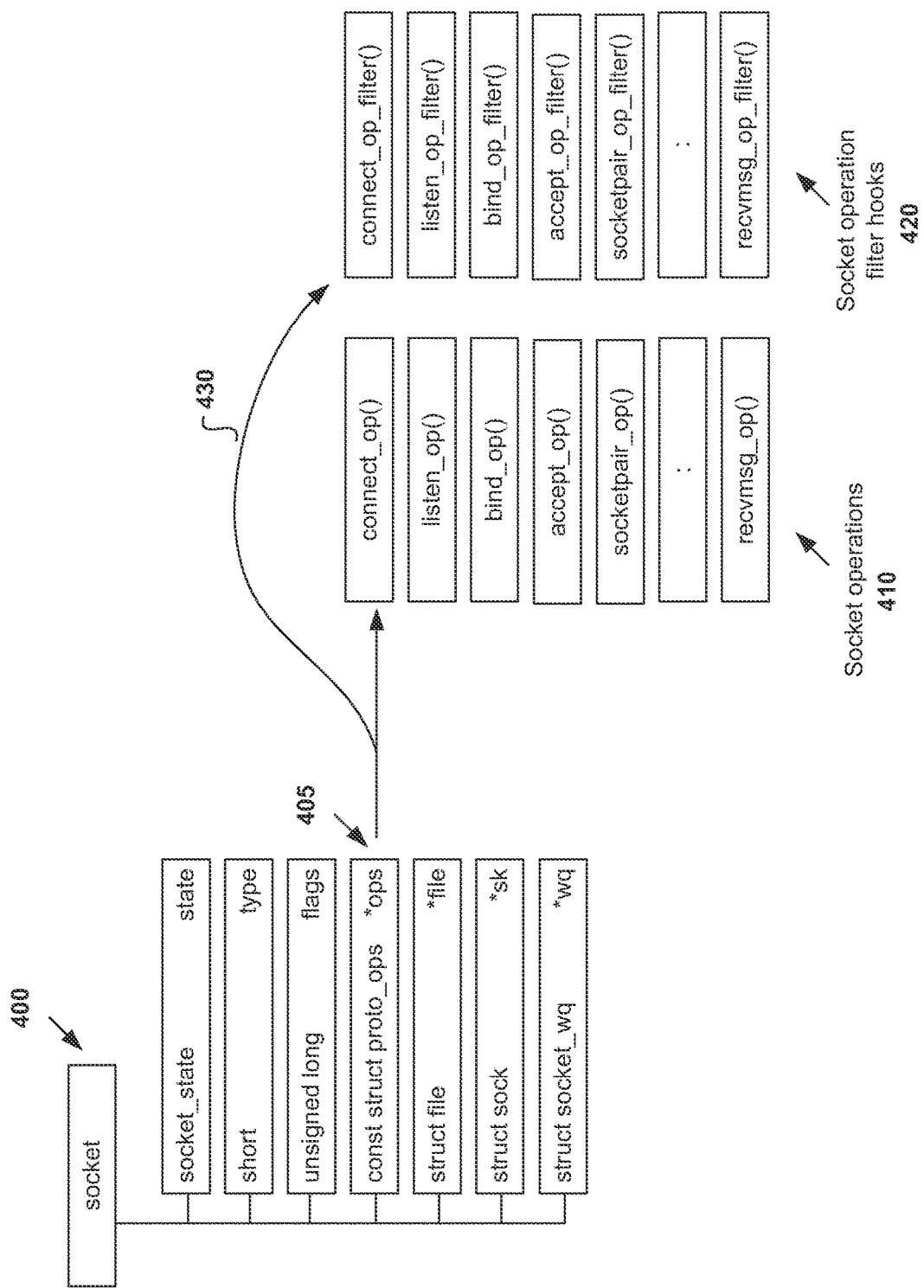
FIG. 4 is a schematic diagram of an example global socket operations structure and redirection of its function pointer from socket operations to socket operation filter hooks, in accordance with at least some embodiments of the present disclosure.

FIG. 4 is a schematic diagram of an example global socket operations structure 405 in a socket structure 400, and redirection of its function pointer from socket operations to socket operation filter hooks, in accordance with at least some embodiments of the present disclosure. Socket structure 400 includes fields such as state to indicate the connection state of the socket, type indicates the protocol type of the socket, and function pointers *ops, *file, *wq and *sk etc. In particular, socket operations function pointer *ops has socket operations structure 405 const struct proto_ops that holds pointers to protocol-specific socket operations. As shown in FIG. 4, socket operations function pointer *ops holds multiple pointers to original socket operations 410, such as connect_op( ), listen_op( ), bind_op( ), accept_op ( ), etc. Table 2 shows a simplified example of socket operations structure 405 const struct proto_ops, where ( . . . ) is used to represent the relevant arguments for a particular socket operation:

TABLE 2

| Socket operations structure |  |
| --- | --- |
| struct proto_ops { | |
| int | family; |
| struct module | *owner; |
| int | (*release) (...): |
| int | (*bind) (...); |
| int | (*connect) (...); |
| int | (*socketpair) (...); |
| int | (*accept) (...); |
| int | (*getname) (...); |
| int | (*poll) (...); |
| int | (*ioctl) (...); |
| int | (*listen) (...); |
| int | (*shutdown) (...); |
| int | (*setsockopt) (...); |
| int | (*getsockopt) (...); |
| int | (*sendmsg) (...); |
| int | (*recvmsg) (...); |
| int | (*mmap) (...); |
| int | (*sendpage) (...); |
| int | (*splice_read_op)(...); |
| } | |

Global socket operations structure 405 is generally in a read-only page table entry in kernel memory space 204. As such, at block 320 in FIG. 3, to allow modification, an in-memory attribute of structure 405 is modified or masked from read-only to read-write.

Next, at block 330 in FIG. 3, the function pointer to original socket operations is stored. In the example in FIG. 4, socket operations function pointer *ops is stored such that original socket operations 410 may be called if necessary.

At block 340 in FIG. 3, the function pointer is redirected to socket operation filter hooks 420. In the example in FIG. 4, socket operations function pointer *ops in global socket operations structure 405 is modified such that it holds pointers to socket operation filter hooks 420, instead of original socket operations 410. The redirection is indicated at 430 in FIG. 4.

At block 350 in FIG. 3, once global socket operations structure 405 is modified, its in-memory attribute is modified from read-write to read-only.

Table 3 shows a list of example socket operations and associated socket operation filter hooks that may be implemented, in accordance to at least some embodiments in the present disclosure. For example, socket operation connect_op( ), is associated with socket operation filter hook connect_op_filter( ); listen_op( ) is associated with listen_op_filter( ), etc. It should be understood that the list in Table 3 is non-exhaustive, and any additional or alternative socket operation may be included.

TABLE 3

Socket operations and socket operation filter hooks

| Socket operation(s) | Function of socket operation(s) | Socket operation filter hook(s) |
|---|---|---|
| connect_op( ) | Establishes a connection | connect_op_filter( ) |
| listen_op( ) | Opens a passive connection to listen on a socket | listen_op_filter( ) |
| bind_op( ) | Binds a unique name or address to the socket | bind_op_filter( ) |
| accept_op( ) | Accepts an incoming connection | accept_op_filter( ) |
| send_op( ), recv_op( ), read_op( ), write_op( ) | Sends and receives data | send_op_filter( ), recv_op_filter( ), read_op_filter( ), write_op_filter( ) |
| socketpair_op( ) | Creates a socket pair for bidirectional communication (both sockets may be on the same system) | socketpair_op_filter( ) |
| sendmsg_op( ), recvmsg_op( ) | Send and receive messages | sendmsg_op_filter( ), recvmsg_op_filter( ) |
| shutdown_op( ) | Closes a connection | shutdown_op_filter( ) |
| setsockopt_op( ), getsockopt_op( ) | Operations relating to socket settings | setsockopt_op_filter( ), getsockopt_op_filter( ) |
| splice_read_op( ) | Transfer data from a pipe into a file | splice_read_op_filter( ) |
| mmap | Performs a mapping operation | mmap_op_filter( ) |
| getname_op( ) | Retrieves a name | getname_op_filter( ) |
| poll_op( ) | Waits for events on multiple descriptors | poll_op_filter( ) |
| ioctl_op( ) | Performs an ioctl (input output control interface) operation on a file descriptor | Ioctl_op_filter( ) |

Once global socket operations structure is modified, a socket created based on the structure will have the operations function pointer *ops redirected to the socket operation filter hooks 420.

The examples in FIG. 3 and FIG. 4 may be applied to different socket properties, for which the modification according to FIG. 3 may be repeated. For example, sockets may be created for different types, families and protocols such as:

Type SOCK_STREAM for stream-based communication using Transmission Control Protocol (TCP) or Stream Control Transmission Protocol (SCTP); SOCK_DGRAM for datagram-based communication using User Datagram Protocol (UDP); or SOCK_RAW for RAW sockets, etc. TCP and UDP are two main IP-based transport protocols. UDP, for example, may be used to send datagrams in video conferencing, audio streaming and similar services. TCP, for example, is used to set up secure, connection-oriented services.

Family or domain AF_INET for IPv4 (Internet Protocol version 4) or AF_INET6 for IPv6 (Internet Protocol version 6), etc.

Protocol IPPROTO_TCP for TCP, IPPROTO_UDP for UDP, IPPROTO_SCTP for SCTP, or BTPROTO_RFCOMM for Bluetooth, etc.

As such, socket operations 410 and socket operation filter hooks 420 in FIG. 4 may be specific to a particular type, family, protocol, etc. For example, inet_accept_op( ), inet_accept_op_filter( ), inet_stream_connect_op( ) and inet_stream_connect_op_filter( ), etc. may be used for IPv4 stream sockets. For example, inet_dgram_connect_op( ) and inet_dgram_connect_op_filter( ), etc. may be used for IPv4 datagram sockets.

Network Introspection at Socket Layer

According to blocks 110 and 120 in FIG. 1, socket operation filter hooks may then be used for network introspection at the socket layer. By filtering socket operations using socket operation filter hooks, information related to socket operations may be gathered. For example, the gathered information may include at least one of: transport and/or network layer information, e.g. TCP/IP 5-tuple (source IP address, source port number, destination IP address, destination port number and protocol type TCP), process identifier, process name and username information associated with the process, etc.

Figure 5:
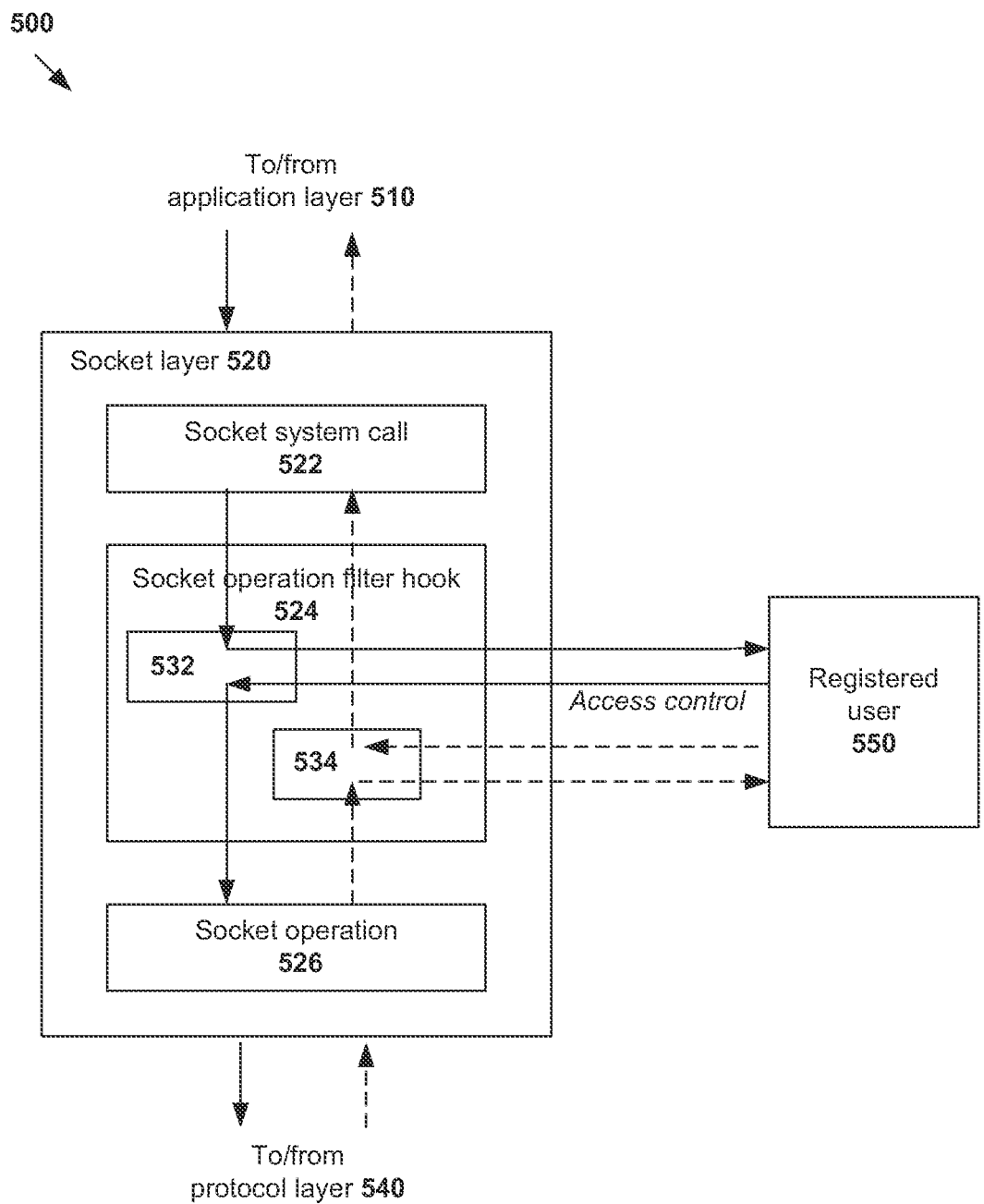
FIG. 5 is a detailed schematic diagram of a socket layer, showing pre-operation and post-operation filtering, in accordance with at least some embodiments of the present disclosure.

FIG. 5 is a schematic diagram 500 of socket layer 520, showing pre-operation and post-operation filtering (e.g., pre-operation 532 and post-operation 534), in accordance with at least some embodiments of the present disclosure. In both pre-operation and post-operation filtering, the introspection action at block 120 in FIG. 1 may be to gather and report information of socket operation 526 to a registered user 550. Pre-operation filtering 532 involves interception by the socket operation filter hook 524 before socket operation 526 is performed. In this case, the introspection action may be to enforce an access control policy, i.e. to allow or deny socket operation 526.

The decision to allow or deny may be made at socket layer 520 and/or by a registered user 530 depending on whether the socket operation 526 is perceived as normal or malicious respectively. If allowed, socket operation 526 is called using the function pointer stored at block 330 in FIG. 3. If denied, socket operation 526 is not called and application layer 510 is notified that socket operation 526 has been unsuccessful.

Post-operation filtering 534 involves interception by socket operation filter hook 524 after socket operation 526 is performed. Since socket operation 526 has already been performed, no access control policy may be enforced. In this case, the introspection action may be to monitor whether socket operation 526 has been successful or otherwise.

Figure 6:
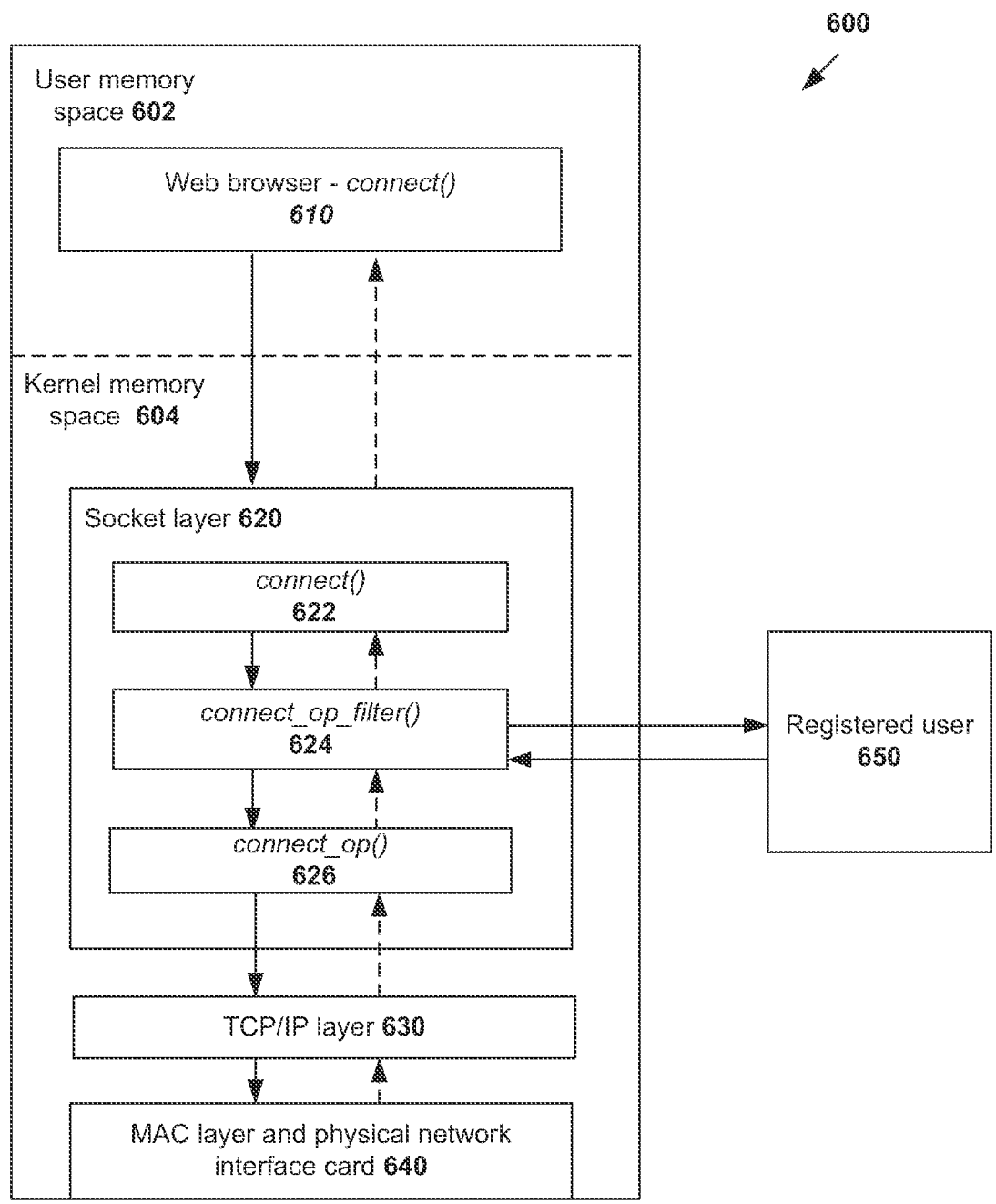
FIG. 6 is a schematic diagram of an example operating system in which network introspection may be performed to filter a connect socket operation, in accordance with at least some embodiments of the present disclosure.

FIG. 6 is a schematic diagram of an example operating system (e.g., operating system 600) in which network introspection may be performed to filter a connect socket operation, in accordance with at least some embodiments of the present disclosure. Similar to FIG. 2, operating system 600 may include user memory space 602 and kernel memory space 604. User memory space 602 includes application process 610, while kernel memory space 604 includes socket layer 620, TCP/IP layer 630, MAC layer and physical layer (e.g. network interface card) 640.

In the example in FIG. 6, application process web browser 610 initiates a system call connect( ), for example, by making a GLIBC library function call SYS_connect( ) to connect to a remote server (not shown for simplicity). At socket layer 620 in operating system 600, socket operation connect_op( ) associated with the system call 622 connect ( ) is initiated.

In response to the initiation of socket operation 626 connect_op( ), filtering is performed using a socket operation filter hook 624 connect_op_filter( ) associated with the socket operation 626. In other words, since the function pointer *ops shown in the example in FIG. 4 has been modified, connect_op_filter( ) is called instead of connect_op( ). This allows information of socket operation 626 to be gathered and reported to a registered user 650. An access control policy may be enforced, i.e. to allow or deny the call to connect_op( ). Assuming that the call is allowed, corresponding operations are invoked at TCP/IP 630 and underlying layers 640 to set up the connection.

Post-operation filtering (shown in dotted lines in FIG. 6) may also be performed. Once socket operation 626 is performed, its result is filtered by socket operation filter hook 624 connect_op_filter( ) at socket layer 620 to monitor whether the connection is successful or otherwise. The information relating to the success or failure of the socket operation may be reported to registered user 650.

It will be appreciated that examples in the present disclosure may be applied to introspect network events at different stages. Some examples are described below.

Outbound events related to an outgoing connection, at different stages such as pre-connect (before initiating connect), post-connect (after successful connection) and disconnect (when connection disconnects), etc. Outgoing disconnect may be filtered based on release( ) and release_op ( ), and shutdown( ) and shutdown_op( ).

Inbound events related to an incoming connection, at different stages such as inbound-connect (during incoming connection) and disconnect (incoming connection disconnects), etc. An incoming connection may be filtered based on accept( ) and accept_op( ).

Listen events that occur when an application process listens at different stages such as start (when an application calls listen) and stop (when an application stops listening), etc. In this case, listen_op( ) socket operations are trapped at the socket layer and their information reported to a registered user.

Similarly, socket operations related to sendmsg( ) and recvmsg( ) may be filtered at the socket layer to facilitate deep packet inspection. Since introspection is performed at the socket layer, it is not necessary to parse packet headers (TCP/IP/MAC) to obtain the actual data or payload.

Other applications include data leakage detection or prevention (by examining outgoing and incoming data), data flow monitoring, endpoint desktop network security and server network security, etc. For data leakage or prevention, the examples of the present disclosure may be used to peek into data sent to or received from a remote machine regardless of whether the data is sensitive. Data flow monitoring may be used to show a graph of network connections between different machines with respect to the application, protocol and user etc. Desktop network security may enforce access control for different users belonging to the same or different groups or group types. Server network security may monitor if there is any unwanted application has started listening on a port and getting any connections or otherwise starting a connection to some remote machine, which may indicate malicious activities.

Virtualized Environment

In some embodiments, network introspection process 100 in FIG. 1 may be used in a virtualized environment to provide better visibility into virtual machines.

Figure 7:
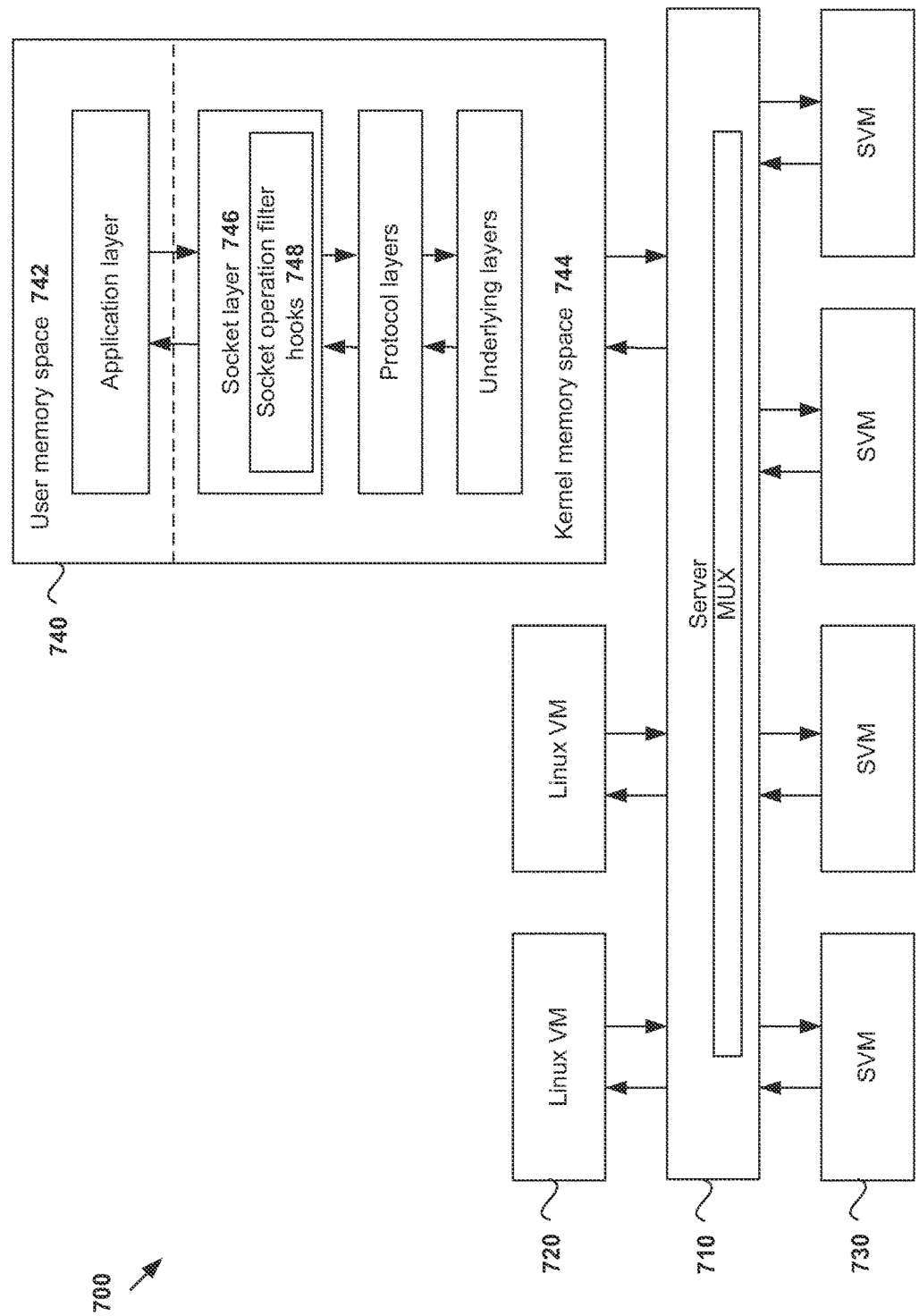
FIG. 7 is a schematic diagram of an example virtualized environment which may implement the example method in FIG. 1, in accordance with at least some embodiments of the present disclosure.

FIG. 7 is a schematic diagram of an example virtualized environment 700 which may implement the example method in FIG. 1, in accordance to at least some embodiments in the present disclosure. It will be appreciated that FIG. 7 depicts a simplified virtualized environment 700 for illustrative purposes, which may have additional components (physical or logical) in practice. For example, there may be additional components in user memory space 742 and kernel memory space 744 to handle various processes, communications, events and messages etc.

In the illustrated example of FIG. 7, virtualization may be used to run multiple operating system instances on a single physical machine. For example, virtualization may allow multiple virtual machines 720 (e.g. running Linux operating system, etc.) on a single server 710 to share the server's physical resources. Server 710 also supports multiple security virtual machines (SVMs) 730 that provide security services to guest virtual machines. Virtualization provides a number of advantages, such as improved utilization of resources, reduction of costs, and server consolidation etc.

As shown in more detail at 740, operating system of the virtual machine may include user memory space 742 and kernel memory space 744. Similar to the example illustrated in FIG. 2, user memory space 742 includes an application layer where various user processes are executed.

On the other hand, kernel memory space 744 runs various kernel processes. Similar to the example in FIG. 2, kernel memory space 744 also includes socket layer 746 with socket operation filter hooks 748 for filtering socket operations according to the examples in FIG. 1 to FIG. 6. A user process in user memory space 742 may communicate with socket layer 746 via any suitable communications techniques, such as a netlink communication channel etc.

Virtualized environments 700 may be subject to security and integrity risks, and each virtual machine 720 may be vulnerable to intrusion and attack from a variety of sources. The additional visibility provided by network introspection into each virtual machine 720 can be very useful for implementing security. For example, since multiple virtual machines 720 are running on the same hardware in a virtualized environment, introspection allows inter-virtual machine network events to be monitored.

Computer System

Figure 8:
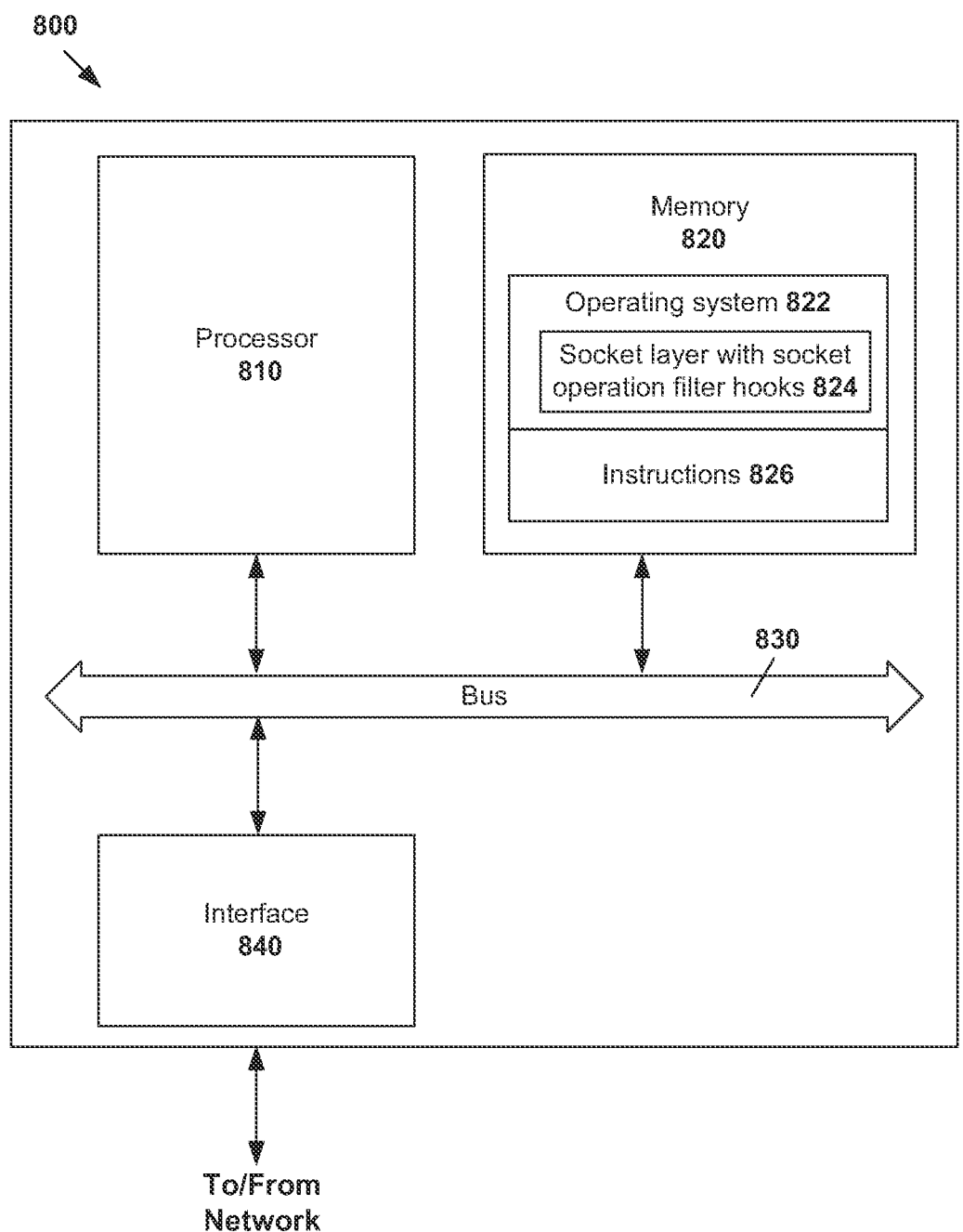
FIG. 8 is an example system configured to perform network introspection in an operating system, in accordance with at least some embodiments of the present disclosure.

The above examples can be implemented by hardware, software or firmware or a combination thereof. FIG. 8 is an example system configured to perform network introspection in an operating system, in accordance to at least some embodiments in the present disclosure. Example system 800 may include processor 810, memory 820, network interface device 840, and bus 830 that facilitate communication among these illustrated components and other components.

Processor 810 is to perform processes described herein with reference to FIG. 1 to FIG. 7. Memory 820 may store information 822 to run an operating system that implements socket layer with socket operation filter hooks 824 as described with reference to FIG. 1 to FIG. 7. Memory 820 may further store machine-readable instructions 824 executable by processor 810 to cause processor 810 to perform processes described herein with reference to FIG. 1 to FIG. 7.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non recordable media (e.g., read-only memory (ROM), random access memory (RAM), magnetic disk storage media, optical storage media, flash memory devices, etc.)

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to perform network introspection in an operating system comprising a user memory space and a kernel memory space, the method comprising:
   in response to an initiation of a socket operation in the kernel memory space, filtering the socket operation in the kernel memory space using a socket operation filter hook associated with the socket operation, wherein:
   the socket operation is associated with an inter-process communication involving an application process in the user memory space and is intercepted at a socket layer interposed between an application layer executing the application process and a protocol-dependent network layer supporting a protocol used during the inter-process communication; and
   the socket operation filter hook filters the socket operation by gathering, at the socket layer, information of the socket operation during a pre-operation filtering period, the pre-operation filtering period occurring after invocation of a system call in the kernel memory space corresponding to the socket operation and before the gathered information reaches the socket operation, and the gathered information includes network layer information or transport layer information and at least one of: application process identifier, application process name and username information associated with the socket operation; and
   performing an introspection action associated with the socket operation filtered using the socket operation filter hook based on the gathered information by reporting the gathered information to a registered user to enforce an access control policy to allow or block the socket operation.

2. The method of claim 1, wherein prior to the initiation of the socket operation, modifying a global socket operations structure in the socket layer in the kernel memory space to include the socket operation filter hook.

3. The method of claim 2, wherein modifying the global socket operations structure comprises:
   creating a socket to obtain the global socket operations structure;
   storing a socket operations function pointer of the global socket operations structure; and
   redirecting the socket operations function pointer to the socket operation filter hook associated with the socket operation.

4. The method of claim 1, wherein the socket operation filter hook is associated with one of the following socket operations: bind, connect, socketpair, accept, getname, poll, loctl, listen, shutdown, setsockopt, sendmsg, recvmsg, mmap, sendpage, splice_read, send, recv, read, write and getsockopt.

5. The method of claim 2, wherein the modification comprises modifying the global socket operations structure to include socket operation filter hook associated with one of the following socket types: stream-based, datagram-based and raw.

6. The method of claim 2, wherein the modification comprises modifying the global socket operations structure to include socket operation filter hooks associated with one of the following domains: Internet Protocol version 4 (IPv4), Internet Protocol version 6 (IPv6).

7. The method of claim 1, wherein the operating system is implemented in a virtual machine in a virtualized environment.

8. A non-transitory computer-readable storage medium containing a set of instructions which, in response to execution by a processor, causes the processor to perform network introspection in an operating system comprising a user memory space and a kernel memory space, comprising:
- in response to an initiation of a socket operation in the kernel memory space, filtering the socket operation in the kernel memory space using a socket operation filter hook associated with the socket operation, wherein:
- the socket operation is associated with an inter-process communication involving an application process in the user memory space and is intercepted at a socket layer interposed between an application layer executing the application process and a protocol-dependent network layer supporting a protocol used during the inter-process communication; and
- the socket operation filter hook filters the socket operation by gathering, at the socket layer, information of the socket operation during a pre-operation filtering period, the pre-operation filtering period occurring after invocation of a system call in the kernel memory space corresponding to the socket operation and before the gathered information reaches the socket operation, and the gathered information includes network layer information or transport layer information and at least one of: application process identifier, application process name and username information associated with the socket operation; and
- performing an introspection action associated with the socket operation filtered using the socket operation filter hook based on the gathered information by reporting the gathered information to a registered user to enforce an access control policy to allow or block the socket operation.

9. The non-transitory computer-readable storage medium of claim 8, wherein prior to the initiation of the socket operation, the method further comprises modifying a global socket operations structure in the socket layer in the kernel memory space to include the socket operation filter hook.

10. The non-transitory computer-readable storage medium of claim 9, wherein modifying the global socket operations structure comprises:
- creating a socket to obtain the global socket operations structure;
- storing a socket operations function pointer of the global socket operations structure; and
- redirecting the socket operations function pointers to the socket operation filter hook associated with the socket operation.

11. The non-transitory computer-readable storage medium of claim 8, wherein the socket operation filter hook is associated with one of the following socket operations: release, bind, connect, socketpair, accept, getname, poll, ioctl, listen, shutdown, setsockopt, sendmsg, recvmsg, mmap, sendpage, splice_read, send, recv, read, write, and getsockopt.

12. The non-transitory computer-readable storage medium of claim 10, wherein the modification comprises modifying the global socket operations structure to include socket operation filter hook associated with one of the following socket types: stream-based, datagram-based and raw.

13. The non-transitory computer-readable storage medium of claim 10, wherein the modification comprises modifying, the global socket operations structure to include socket operation filter hooks associated with one of the following domains: Internet Protocol version 4 (IPv4), Internet Protocol version 6 (IPv6).

14. The non-transitory computer-readable storage medium of claim 8, wherein the operating system is implemented in a virtual machine in a virtualized environment.

15. The method of claim 1, further comprising:
- prior to the initiation of the socket operation in the kernel memory space, executing a function, by the application process, defined in a function library in the user memory space, wherein the function library is coupled with a system call interface in the kernel memory space that dispatches the invocation of the system call.

* * * * *